Patented Oct. 4, 1932

1,880,514

UNITED STATES PATENT OFFICE

CYRIL J. STAUD AND CHARLES S. WEBBER, OF ROCHESTER, NEW YORK, ASSIGNORS TO EASTMAN KODAK COMPANY, OF ROCHESTER, NEW YORK, A CORPORATION OF NEW YORK

CELLULOSE DERIVATIVE PRODUCTS

No Drawing.     Application filed June 17, 1929.    Serial No. 371,713.

This invention relates to compositions of matter comprising certain cellulose derivatives, and triethanolamine alone or in combination with other suitable materials.

In the production of photographic film, lacquer films, artificial silk filaments and the like from cellulose derivatives it is customary to prepare a solution of a cellulose derivative, such as cellulose acetate or nitrate, in a suitable solvent, together with one or more plasticizers or softeners which contributes the necessary flexibility and lasting qualities to the film or filament. Of the properties which it is necessary to contribute to the cellulose derivative in order to make it most useful, flexibility is probably one of the most important.

Although numerous compounds have been added to dopes of cellulose derivatives in making the cellulose useful for the production of film or filament it was not known until our discovery that triethanolamine would contribute quite useful and varied properties to compositions of certain cellulose derivatives. Triethanolamine, a rather recently discovered compound, is a tertiary aliphatic ammonia base consisting of three ethyl groups attached to the ammonia nitrogen atom and having on the outer carbon atom of each ethyl group a hydroxyl group. It is a viscous, water clear, hygroscopic, high boiling liquid. We have found that it is miscible in certain proportions with acetone, alcohols, ethylene chloride, benzol and water. It may under certain conditions be dissolved out or absorbed by water from a finished product containing it and although this faculty has slight disadvantages in some instances these are, however, outweighed by the advantages of this property. Triethanolamine has the general formula of $(C_2H_4OH)_3N$.

Although triethanolamine, when taken alone, is a non-solvent for cellulose acetate it is, however, a solvent for cellulose nitrate and as such operates in the nature of a good plasticizer therefor. We have also found that triethanolamine when dissolved in acetone or methanol will dissolve cellulose nitrate. In either event it operates as a good plasticizer for cellulose nitrate, giving to a film produced from such solutions, by extruding into a coagulating bath or spreading on a film forming surface, a rather high degree of flexibility.

The use of triethanolamine in the formation of cellulose acetate compositions, and films or filaments produced therefrom, appears to have greater application than when used in connection with cellulose nitrate. Although triethanolamine will not alone readily dissolve celluose acetate, nevertheless when employed in conjunction with other solvents, such as those named herein and examples of which are hereinafter given, will quite readily dissolve cellulose acetate and give a dope from which may be formed a product of high flexibility.

For instance, 50 grams of acetone soluble cellulose acetate may be dissolved in a mixture of 215 ccs. of acetone and 10 ccs. of triethanolamine for the production of a good acetate dope from which a film or filament having a high degree of flexibility may be produced. A satisfactory dope may also be produced by dissolving 50 grams of acetone soluble cellulose acetate in a mixture of 225 ccs. of acetone and 2.5 ccs. of triethanolamine although products produced therefrom will not have quite as high a degree of flexibility as those utilizing slightly more of the triethanolamine.

Cellulose acetate may also be dissolved in a mixture comprising approximately 10 percent triethanolamine and 90 per cent ethylene chloride. Smaller amounts of triethanolamine may be used with the ethylene chloride if desired with, however, a slight loss in the flexibility of products made from a dope so formed. Triethanolamine may also be introduced into other acetate compositions where an acetate solvent is employed which is also miscible with the triethanolamine.

We have also made a rather striking discovery in that where products such as film or filament made from dopes containing triethanolamine, as above mentioned, are subjected to the dissolving action of water that the triethanolamine will be gradually dissolved out of the film or filament and that the larger the percentage of triethanolamine incorporated in the cellulose product the more rapid per unit of triethanolamine is the dissolving action of the water upon the triethanolamine, namely, where a film produced from a dope as above described containing 10 ccs. of triethanolamine was subjected to the dissolving action of water practically the entire triethanolamine content of the film was more rapidly dissolved out of the film than in those cases where only 2.5 ccs. of triethanolamine were incorporated in the dope. Another striking discovery made by us was that filaments containing the higher percentages of triethanolamine when subjected to the dissolving action of water would result in a highly opaque material which is very desirable in the manufacture of threads for the spinning of rayon as it was found that threads so produced have a higher absorptive power for dyes than do threads which are not so treated. This seeming phenomenon may also be used to good advantage in giving to lacquer films a greater covering power, as products made from the high percentages of triethanolamine when treated with water for a short period will give a product having good opacity.

It is also to be noted that a product produced from a dope composed of 2.5 parts of triethanolamine to 50 parts of acetone soluble cellulose acetate when treated with water will not have its opacity increased to any appreciable extent.

As a general proposition, therefore, within the limits stated, it may be said that a product containing a high triethanolamine content has more flexibility than one with a low triethanolamine content although the first named product will give up its triethanolamine to the dissolving action of water to which it is subjected much quicker than a product containing a smaller amount of triethanolamine and products of high triethanolamine content will readily become opaque when subjected to the dissolving action of water whereas those with low triethanolamine content will not have their opacity affected to any appreciable extent by such water treatment.

The further use which we have found for this interesting compound is as a sensitizer for light sensitive silver halide emulsions. For instance, if the ordinary commercial photographic film or plate be bathed for approximately two minutes in an approximately 4 percent aqueous solution of triethanolamine it will be found, upon subjecting the film or plate so treated to the step tablet test or any other suitable sensitivity test, that the sensitivity of the light sensitive emulsion has been greatly appreciated. In fact it may be satisfactory to merely incorporate a small amount of the triethanolamine in the film support so that upon being coated with a light sensitive emulsion the said emulsion will gradually be sensitized upon standing by the gradual transfusion of some of the triethanolamine into the emulsion coating of the film.

Thus it will be noted that by the use of triethanolamine in the production of various products comprising it and cellulose derivatives that one or more useful properties are contributed to the finished product, namely, flexibility, opacity and/or light sensitivity, depending upon the particular manner in which the triethanolamine is utilized or treated.

Having thus described our invention, what we claim as new and desire to secure by Letters Patent is:

1. A composition of matter comprising a cellulose ester, triethanolamine and a common solvent.

2. A composition of matter comprising a cellulose ester, triethanolamine and acetone.

3. A composition of matter comprising a cellulose ester, triethanolamine and ethylene chloride.

4. A composition of matter comprising a cellulose acetate, triethanolamine and a common solvent.

5. A composition of matter comprising a cellulose acetate, triethanolamine and acetone.

6. A composition of matter comprising a cellulose acetate, triethanolamine and ethylene chloride.

Signed at Rochester, New York, this 9th day of June, 1929.

CYRIL J. STAUD.
CHARLES S. WEBBER.